United States Patent
Liu et al.

(10) Patent No.: US 12,411,197 B2
(45) Date of Patent: Sep. 9, 2025

(54) DIRECTION FINDING ANTENNA

(71) Applicant: ACCTON TECHNOLOGY CORPORATION, Hsinchu (TW)

(72) Inventors: I-Ru Liu, Hsinchu (TW); Chun-Yi Kuo, Hsinchu (TW)

(73) Assignee: ACCTON TECHNOLOGY CORPORATION, Hsinchu (TW)

( * ) Notice: Subject to any disclaimer, the term of this patent is extended or adjusted under 35 U.S.C. 154(b) by 366 days.

(21) Appl. No.: 18/096,152

(22) Filed: Jan. 12, 2023

(65) Prior Publication Data

US 2024/0036144 A1 Feb. 1, 2024

(30) Foreign Application Priority Data

Jul. 26, 2022 (CN) .......................... 202221933678.1

(51) Int. Cl.
  *G01S 3/02* (2006.01)
  *G01S 3/04* (2006.01)
  *G01S 3/12* (2006.01)
  *G01S 3/72* (2006.01)
  *H01Q 19/10* (2006.01)

(52) U.S. Cl.
  CPC ............... *G01S 3/043* (2013.01); *G01S 3/12* (2013.01); *G01S 3/72* (2013.01); *H01Q 19/10* (2013.01)

(58) Field of Classification Search
  CPC ... G01S 3/043; G01S 3/12; G01S 3/00; G01S 3/72; H01Q 9/06; H01Q 9/285; H01Q 19/10
  USPC .................................................. 342/417, 419
  See application file for complete search history.

(56) References Cited

U.S. PATENT DOCUMENTS

| | | | | |
|---|---|---|---|---|
| 9,082,307 | B2 * | 7/2015 | Sharawi | H01Q 9/16 |
| 10,938,105 | B2 * | 3/2021 | Snyder | H01Q 19/193 |
| 11,271,319 | B2 * | 3/2022 | Celik | H01Q 1/38 |
| 2016/0164182 | A1 * | 6/2016 | Lai | H01Q 21/0006 216/13 |
| 2024/0377494 | A1 * | 11/2024 | Vale | H01Q 21/20 |
| 2024/0380108 | A1 * | 11/2024 | Chen | H01Q 21/205 |

FOREIGN PATENT DOCUMENTS

| | | | | | |
|---|---|---|---|---|---|
| CN | 102055072 | B | * | 6/2014 | H01Q 1/36 |
| CN | 110854505 | A | * | 2/2020 | H01Q 19/06 |
| CN | 213753050 | U | * | 7/2021 | H01Q 1/38 |
| GB | 2331185 | A | * | 5/1999 | H01Q 19/062 |
| WO | WO-2020041858 | A1 | * | 3/2020 | H01Q 21/29 |

* cited by examiner

*Primary Examiner* — Chuong P Nguyen
(74) *Attorney, Agent, or Firm* — Birch, Stewart, Kolasch & Birch, LLP

(57) ABSTRACT

A direction finding antenna includes a substrate, a reflecting ring, and a plurality of radiating elements, wherein the substrate has a surface. The reflecting ring is disposed on the surface of the substrate and is formed by connecting a plurality of side wires and is a closed polygon. Each of the side wires forms a reflector. The radiating elements are disposed on the surface of the substrate and are respectively located on an outside of the side wires, and each of the radiating elements corresponds to one of the side wires. Each of the side wires and each of the corresponding radiating elements form an antenna structure, and the antenna structures face different directions, thereby providing the needed accuracy of direction finding in different directions.

8 Claims, 19 Drawing Sheets

DIRECTION FINDING ANTENNA

BACKGROUND OF THE INVENTION

Technical Field

The present disclosure relates generally to an antenna, and more particularly to a direction finding antenna.

Description of Related Art

With the advance of the wireless communication, the use of mobile electronic devices increases gradually. In order to position a mobile device in a space as the mobile electronic devices are moving, there are many technologies have been developed, for example, to estimate a distance between the mobile device and a positioning device by using the Received Signal Strength Indicator (RSSI).

However, only acknowledging the distance between the mobile device and the positioning device is still not accurate for some positioning uses. For example, in property management, typically a Bluetooth device, such as a smart tag, is disposed on an object. The positioning device could only estimate the distance between the mobile device and the positioning device. In view of a user, the user could only acknowledge a distance between the user and the object, but not a direction of the object relative to the user.

Therefore, Direction Finding technology has been developed. For example, a plurality of antennas receives a wireless signal of a targeted mobile device, and a direction of the targeted mobile device relative to each of the antennas could be determined through the wireless signal received by each of the antennas. Alternatively, a plurality of antennas sends a wireless signal to the mobile device, and a position of the mobile device relative to each of the antennas could be determined by the mobile device. However, as direction finding technology requires a plurality of antennas, a directivity of each of the antennas is needed to be large and the structure of each of the antennas is complex, thereby occupying a large space.

BRIEF SUMMARY OF THE INVENTION

In view of the above, the primary objective of the present disclosure is to provide a direction finding antenna having a good accuracy of direction finding.

Another primary objective of the present disclosure is to provide a direction finding antenna conducive to miniaturization.

The present disclosure provides a direction finding antenna, including a substrate, a reflecting ring, and a plurality of radiating elements, wherein the substrate has a surface. The reflecting ring is disposed on the surface of the substrate, wherein the reflecting ring is formed by connecting a plurality of side wires and is a closed polygon. The radiating elements are disposed on the surface of the substrate and located on an outside of the side wires respectively and correspondingly. Each of the radiating elements corresponds to one of the side wires.

The present disclosure further provides a direction finding antenna including a substrate and a plurality of antenna structures, wherein the substrate has a surface. The antenna structures are disposed on the surface of the substrate and respectively face to different directions, wherein each of the antenna structures includes a reflector and a radiating element. The reflectors are connected together to form a closed polygon, and the radiating elements are respectively and correspondingly located on an outside of one of the reflectors.

With the aforementioned design, the reflecting ring has the structure of the continuous and closed polygon, and each of the side wires serves as a reflector to reflect a signal sent by each of the radiating elements, increasing a directivity of each of the antennas and improving the accuracy of direction finding. Besides, the structure of the direction finding antenna of the present disclosure is simple and conducive to miniaturization.

BRIEF DESCRIPTION OF THE SEVERAL VIEWS OF THE DRAWINGS

The present disclosure will be best understood by referring to the following detailed description of some illustrative embodiments in conjunction with the accompanying drawings, in which.

DETAILED DESCRIPTION OF THE INVENTION

Figure 1:
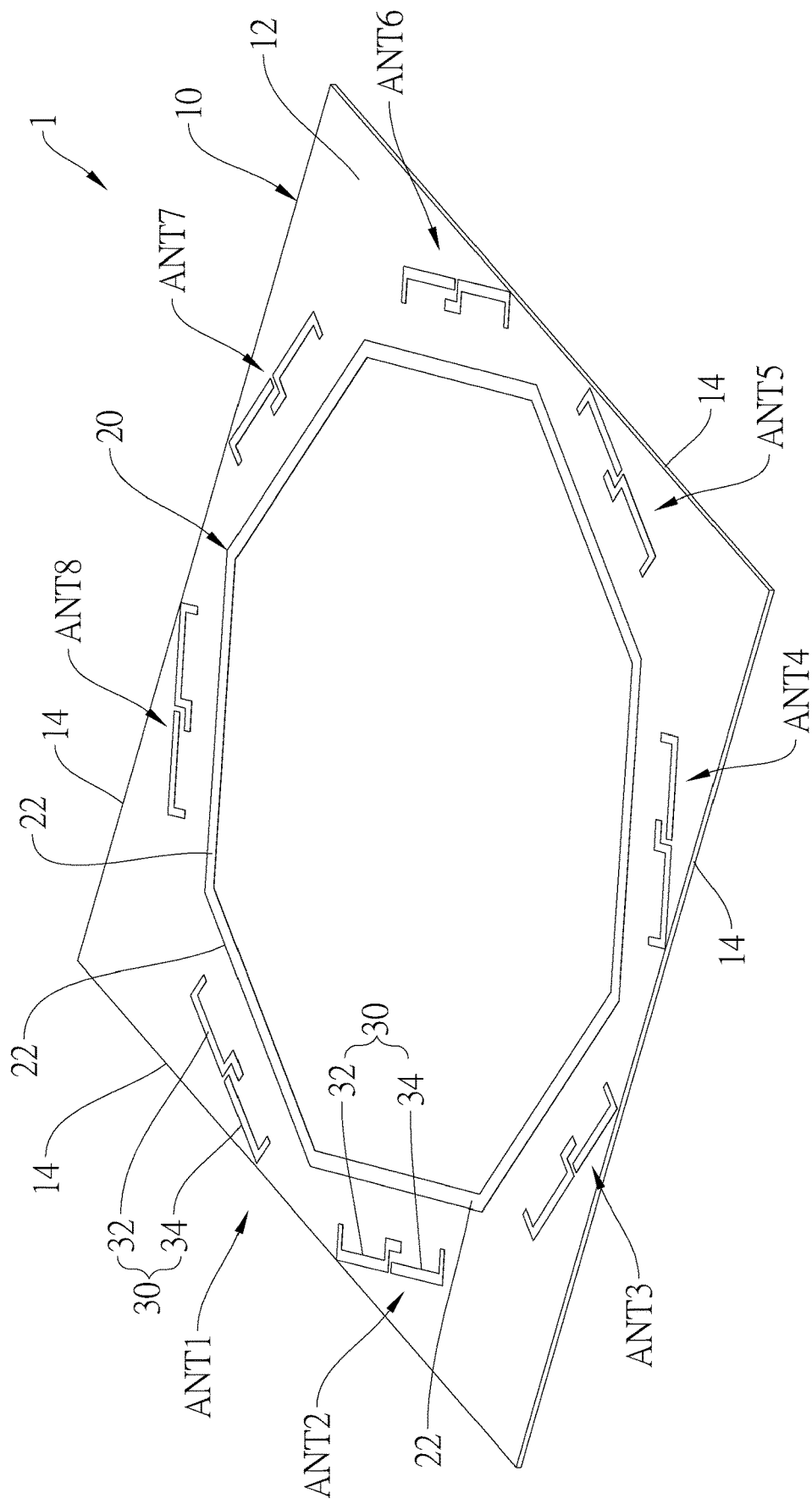
FIG. 1 is a perspective view of the direction finding antenna according to a first embodiment of the present disclosure.
Figure 2:
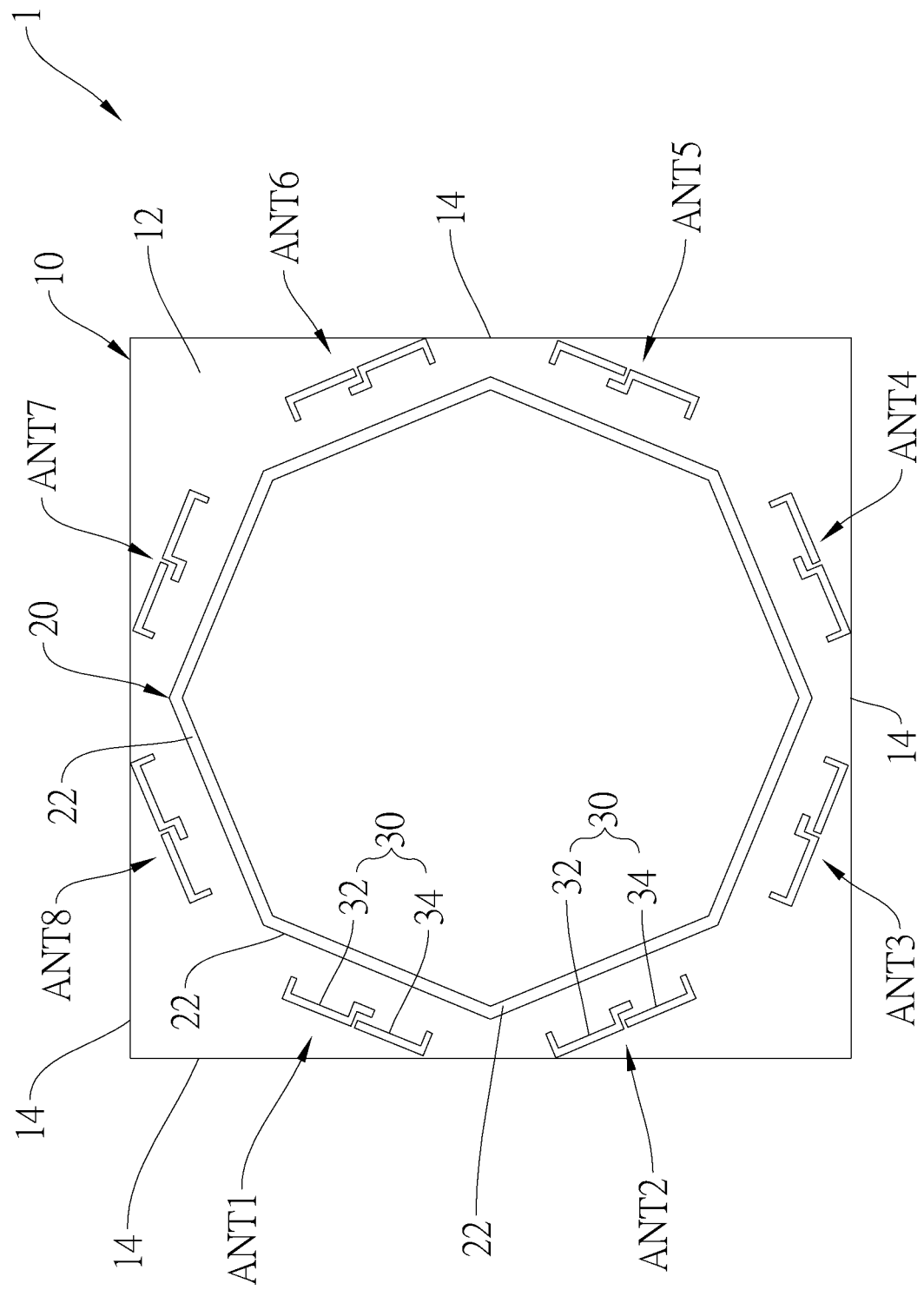
FIG. 2 is a top view of the direction finding antenna according to the first embodiment of the present disclosure.

A direction finding antenna 1 according to a first embodiment of the present disclosure is illustrated in FIG. 1 to FIG. 3B and is a printed microstrip antenna including a substrate 10, a reflecting ring 20, and a plurality of radiating elements 30.

The substrate 10 has a surface 12. In the current embodiment, the substrate 10 is a square substrate, wherein a length of the substrate 10 is, but not limited to, 180 mm and a width of the substrate 10 is, but not limited to, 180 mm. The substrate 10 could be made of, but not limited to, a glass fiber filled EPOXY sheet, a ceramic filled PTFE sheet, a hydrocarbon/ceramic sheet, a Bakelite, or glass fibers.

The reflecting ring 20 is disposed on the surface 12 of the substrate 10 and is a metal lead wire disposed on the surface 12 of the substrate 10. The reflecting ring 20 is formed by connecting a plurality of side wires 22 and is a closed polygon. In other words, the side wires 22 are connected to form the reflecting ring 20 which is a closed polygon. A length of each of the side wires 22 is identical, and two opposite ends of each of the side wires 22 in an extending direction of each of the side wires 22 are respectively connected to other two of the side wires 22. Each of the side wires 22 forms a reflector adapted to reflect a wireless signal, thereby a length of the side wire 22 in the longitudinal direction of the side wire 22 could be increased as large as possible in a limited space and the reflection effect could be enhanced. In the current embodiment, the reflecting ring 20 is, but not limited to, an octagon. In other embodiments, the reflecting ring 20 could be a triangle, a quadrilateral, a pentagon, or a polygon with more than five sides. Preferably, the reflecting ring 20 is a closed regular polygon.

Figure 3A:
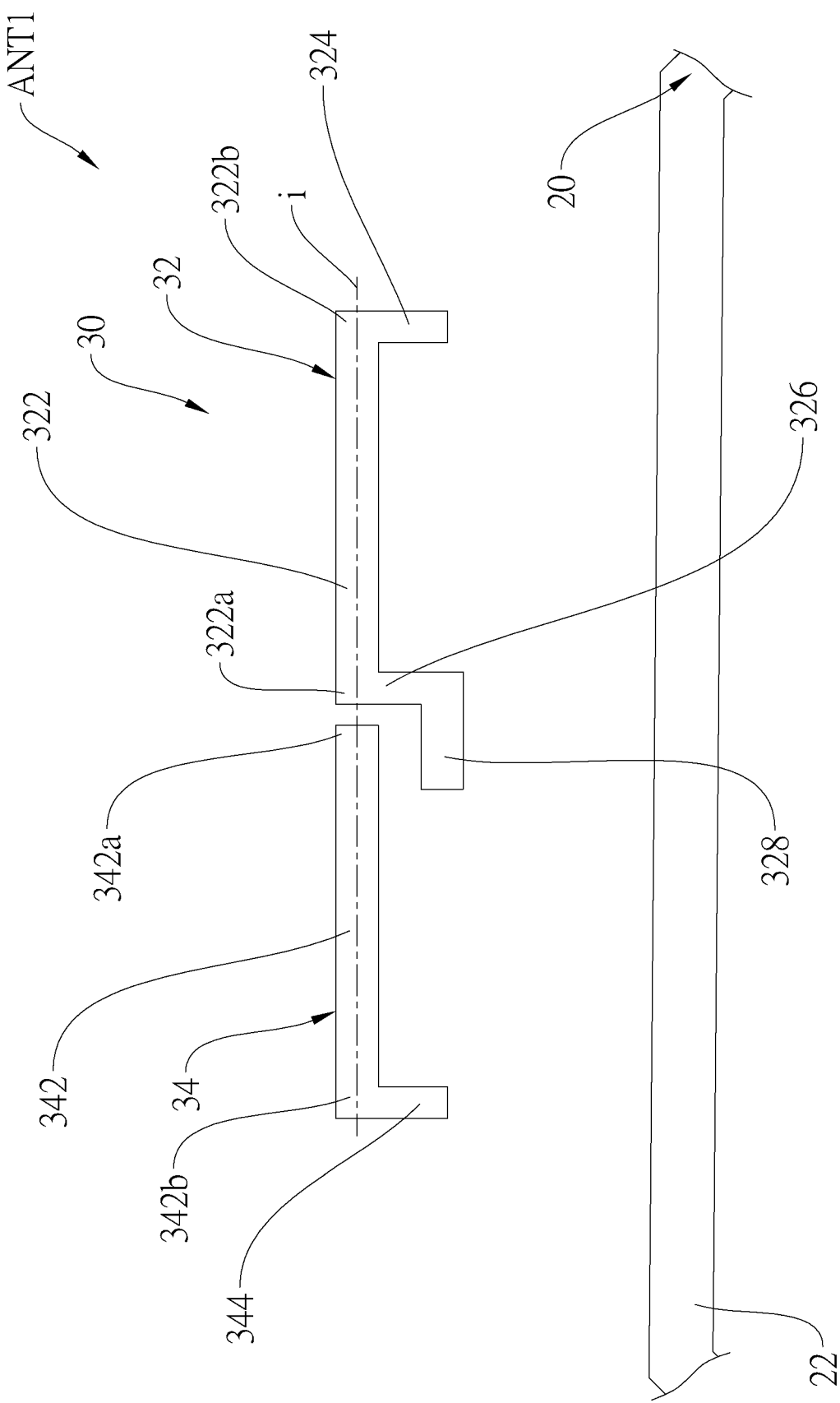
FIG. 3A is a schematic view of the antenna structure ANT1 according to the first embodiment of the present disclosure.
Figure 3B:
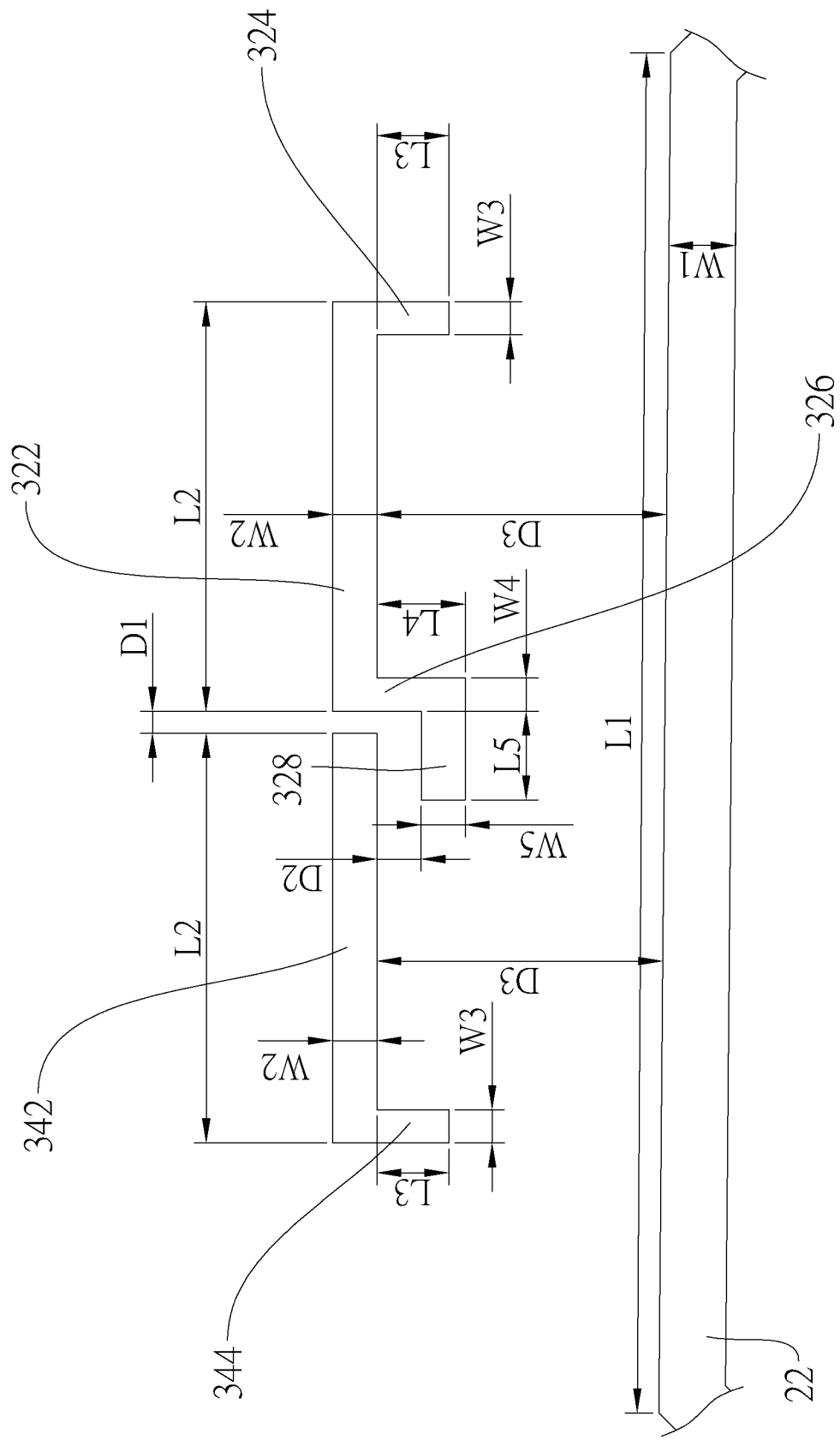
FIG. 3B is similar to FIG. 3A, showing the distances D1 to D3, the lengths L1 to L5, and the widths W1 to W5 of the antenna structure ANT1 according to the first embodiment of the present disclosure.

Referring to FIG. 3B, in the current embodiment, a width W1 of each of the side wires 22 is 3 mm as an example, and a length L1 of an outer edge of each of the side wires 22 is 61 mm as an example.

The radiating elements 30 are disposed on the surface 12 of the substrate 10, wherein each of the radiating elements 30 is correspondingly located on an outside of one of the side wires 22. For example, each of the radiating elements 30 could be a metal lead wire disposed on the surface 12 of the substrate 10. Each of the radiating elements 30 corresponds to one of the side wires 22 and is adapted to transmit or receive a wireless signal in an orientation correspondingly. Each of the radiating elements 30 could be also called a driver. In the current embodiment, each of the radiating elements 30 makes use of a dipole antenna structure.

In the current embodiment, each of the side wires 22 and each of the radiating elements 30 of the direction finding antenna 1 jointly form a plurality of antenna structures ANT1 to ANT8 facing different directions. In order to illustrate easily, the description below would only describe the radiating element 30 and the side wire 22 of the antenna structure ANT1 as an example, for the antenna structures ANT1 to ANT8 have substantially the same configurations.

As shown in FIG. 3A and FIG. 3B, the radiating element 30 includes a first radiator 32 and a second radiator 34 that are spaced, wherein the first radiator 32 has a first main section 322 and a first side section 324, and the second radiator 34 has a second main section 342 and a second side section 344. The first main section 322 and the second main section 342 are respectively a rectangular shape, wherein both a width W2 of the first main section 322 and a width W2 of the second main section 342 are 2 mm as an example, and both a length L2 of the first main section 322 and a length L2 of the second main section 342 are 18.5 mm as an example. Both a longitudinal direction of the first main section 322 and a longitudinal direction of the second main section 342 are located on an axis i that is parallel to the extending direction of the corresponding side wire 22 of the reflecting ring 20. The first main section 322 has a first end 322a and a second end 322b in the longitudinal direction of the first main section 322. The second main section 342 has a first end 342a and a second end 342b in the longitudinal direction of the second main section 342. The first end 322a of the first main section 322 and the first end 342a of the second main section 342 are adjacent and spaced by a distance D1 without contact. In the current embodiment, the distance D1 is 1 mm as an example. The first side section 324 is connected to the second end 322b of the first main section 322, and the second side section 344 is connected to the second end 342b of the second main section 342. The first side section 324 and the second side section 344 bend and extend along a direction deviating from the axis i, thereby fulfilling an equivalent antenna length through bending. In the current embodiment, the extending direction of the first side section 324 and the extending direction of the second side section 344 are perpendicular or substantially perpendicular to the axis i, and the first side section 324 and the second side section 344 extend towards the corresponding side wire 22. In other words, an outer end of the first radiator 32 and an outer end of the second radiator 34 bend towards the corresponding side wire 22 (i.e., bend inwards), thereby to fulfill the purpose of the miniaturization of the direction finding antenna 1. In the current embodiment, both a width W3 of the first side section 324 and a width W3 of the second side section 344 are 1.5 mm as an example, and both a length L3 of the first side section 324 and a length L3 of the second side section 344 are 3.25 mm as an example.

The first side section 324 and the second side section 344 are adapted to increase a total length of the first radiator 32 and the second radiator 34, thereby increasing a length of a current path.

In the current embodiment, the first radiator 32 further includes a third side section 326 that is connected to the first end 322a of the first radiator 32 and extends towards the side wire 22. A width W4 of the third side section 326 is 1.5 mm as an example (i.e., equal to the width W3 of the first side section 324 and the width W3 of the second side section 344), and a length L4 of the third side section 326 is 4 mm as an example. Moreover, the first radiator 32 could further include an extending section 328 that is connected to the third side section 326 and extends to a position between the corresponding first end 342a of the second main section 342 and the side wire 22. A width W5 of the extending section 328 is 2 mm as an example (i.e., equal to the width W2 of the first main section 322 and the width W2 of the second main section 342), and a length L5 of the extending section 328 is 4 mm as an example. A part of a projection area of the extending section 328 projecting along a direction perpendicular to the axis i overlaps with a part of the first main section 322, wherein an overlapping length in the direction parallel to the axis i is about 3 mm, and a distance D2 in the direction perpendicular to the axis i spaced between the part of the extending section 328 overlapping with the first main section 322 and the first main section 322 is 2 mm.

In the current embodiment, both a distance D3 between an outer edge of the side wire 22 and an inner edge of the first main section 322 and a distance D3 of the outer edge of the side wire 22 and an inner edge of the second main section 342 are about 13 mm.

The surface 12 of the substrate 10 on a side of the radiating element 30 away from the side wire 22, i.e., a space between an outer edge of the first main section 322 and a side edge 14 of the substrate 10 and a space between an outer edge of the second main section 342 and the side edge 14 of the substrate 10, does not have other functional antenna elements, such as a director of a Yagi antenna. Conventional Yagi antennas are constructed of a reflector, a driven member, and a plurality of directors, but the direction finding antenna 1 in the current embodiment does not have a director in each of the directions, thereby the direction finding antenna 1 in the current embodiment could be more compact than the conventional Yagi antennas, and hence conducive to miniaturization. Moreover, as the outer end of the first radiator 32 and the outer end of the second radiator 34 correspondingly bend towards the side wire 22, each of the antenna structures ANT1 to ANT8 could be even more compact. In other embodiments, other functional antenna elements could be disposed in the space between the outer edge of the first main section 322 and the side edge 14 of the substrate 10 and the space between the outer edge of the second main section 342 and the side edge 14 of the substrate 10, further increasing a directivity of each of the antenna structures ANT1 to ANT8.

An end of the extending section 328 of the first radiator 32 away from the third side section 326 and the first end 342a of the second radiator 34 could be connected to a wireless signal control device (not shown), wherein the wireless signal control device respectively drives the plurality of radiating elements 30 to transmit a wireless signal. More specifically, signals could be fed jointly through the end of the extending section 328 of the first radiator 32 and the first end 342a of the second radiator 34, and could be sent jointly through the first main section 322 and the first side section 324, and the second main section 342 and the second side section 344. The reflecting ring 20 is connected to a ground. A part of the wireless signal transmitted by the radiating element 30 is transmitted in a corresponding direction by the reflectors formed by each of the side wires 22. Moreover, the radiating elements 30 could receive a wireless signal come from an external electronic device (not shown) and transmit the wireless signal to the wireless signal control device, so as to determine a direction and a distance of the external electronic device relative to the direction finding antenna 1.

In an embodiment, the first radiator 32 and the second radiator 34 could be a symmetric structure (i.e., the third side section 326 and the extending section 328 are omitted), and the first end 322a of the first radiator 32 and the first end 342a of the second radiator 34 are connected to the wireless signal control device (i.e., the first end 322a of the first radiator 32 and the first end 342a of the second radiator 34 directly feed a signal).

In an embodiment, the outer end of the first radiator 32 (i.e., the first side section 324) and the outer end of the second radiator 34 (i.e., the second side section 344) could be designed to bend in a direction away from the side wire 22, which could fulfill the equivalent antenna length as well.

Figure 4A:
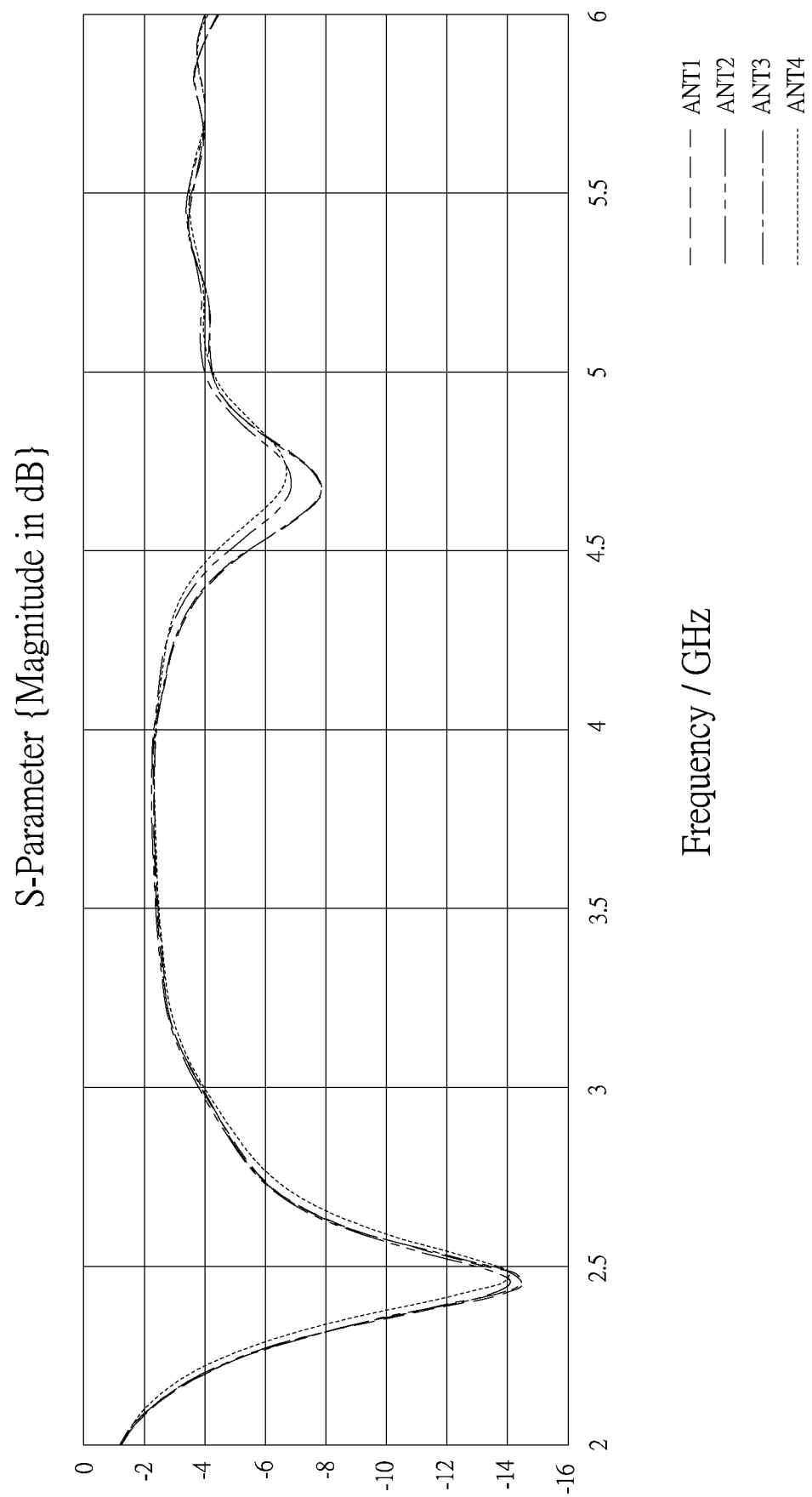
FIG. 4A is a schematic view showing a return loss of each of the antenna structures ANT1 to ANT4 of the direction finding antenna according to the first embodiment of the present disclosure.
Figure 4B:
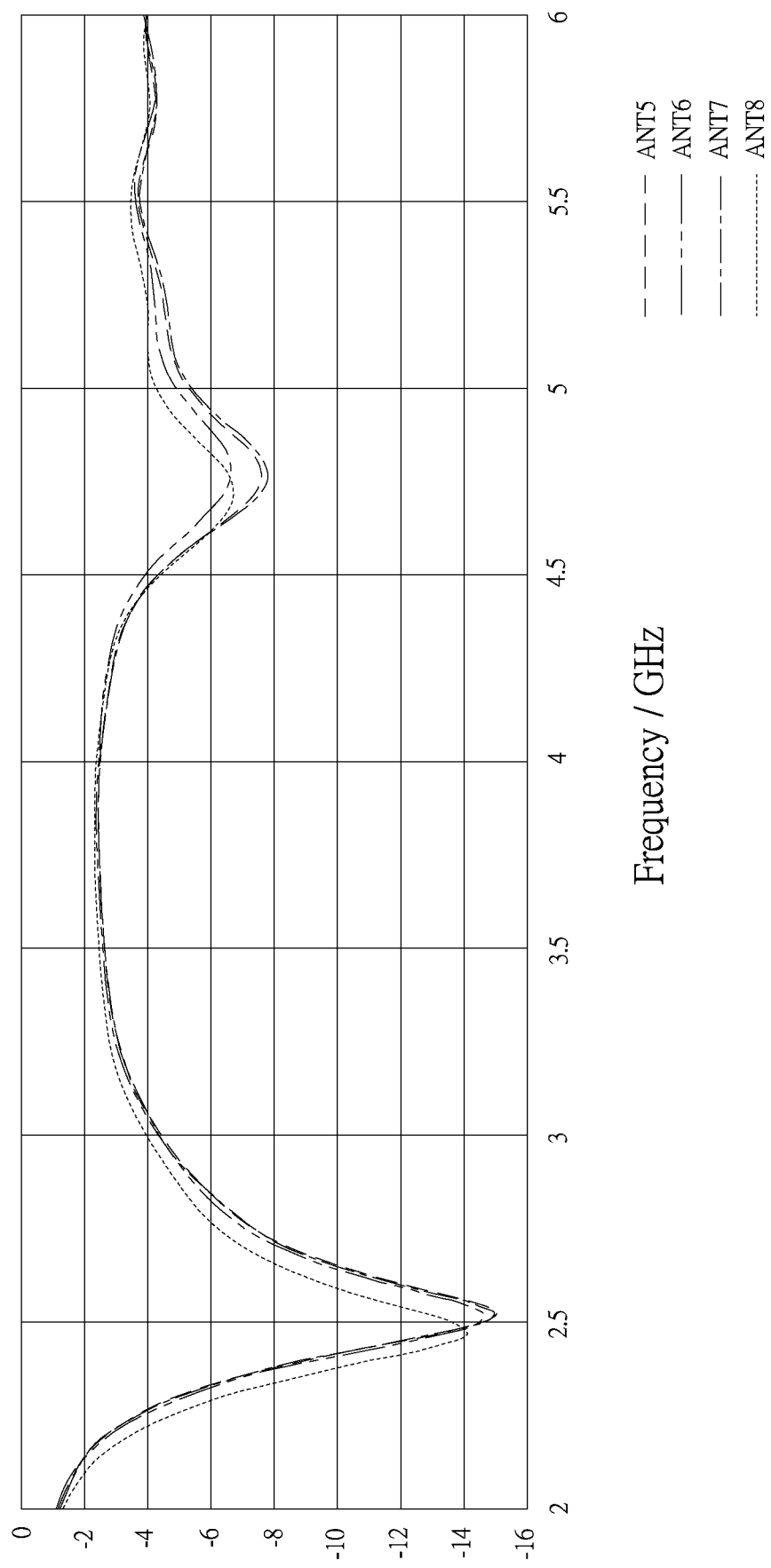
FIG. 4B is a schematic view showing a return loss of each of the antenna structures ANT5 to ANT8 of the direction finding antenna according to the first embodiment of the present disclosure.

Referring to FIGS. 4A and 4B, in two schematic views showing a return loss of each of the antenna structures ANT1 to ANT8 of the direction finding antenna 1 in the current embodiment, the return loss of each of the antenna structures ANT1 to ANT8 is less than −13 dB at 2.4 GHz frequency.

Moreover, when the direction finding antenna 1 in the current embodiment operates between 2 GHz and 6 GHz frequency, the isolation among the antenna structures ANT1 to ANT8 is less than −20 dB.

FIG. 5 to FIG. 12 respectively show a radiation pattern of the antenna structures ANT1 to ANT8 operating at 2.45 GHz. Table 1 is an analysis table according to the aforementioned radiation patterns and shows that a main lobe magnitude of each of the antenna structures ANT1 to ANT8 ranges between 5.54 dBi and 5.68 dBi, and a 3 dB-beamwidth of each of the antenna structures ANT1 to ANT8 ranges between 51.7 degrees and 54.6 degrees. As the 3 dB-beamwidth of each of the antenna structures ANT1 to ANT8 is less than 54.6 degrees, a better accuracy of direction finding could be provided, so that the direction finding antenna 1 could have a better field of view and a better angle of arrival.

TABLE 1 the analysis table according to the radiation pattern of each of the antenna structures ANT1 to ANT8

| Antenna structure | ANT1 | ANT2 | ANT3 | ANT4 | ANT5 | ANT6 | ANT7 | ANT8 |
|---|---|---|---|---|---|---|---|---|
| Main lobe magnitude (dBi) | 5.61 | 5.68 | 5.62 | 5.63 | 5.55 | 5.54 | 5.68 | 5.67 |

TABLE 1-continued the analysis table according to the radiation pattern
of each of the antenna structures ANT1 to ANT8

| Antenna structure | ANT1 | ANT2 | ANT3 | ANT4 | ANT5 | ANT6 | ANT7 | ANT8 |
|---|---|---|---|---|---|---|---|---|
| Main lobe direction (deg) | 71 | 114 | 161 | 204 | 252 | 293 | 341 | 25 |
| 3 dB-beamwidth (deg) | 51.7 | 53.7 | 52.9 | 53.3 | 55.6 | 54.6 | 52.6 | 53.8 |
| Side lobe level (dBi) | −3.6 | −4.1 | −3.6 | −3.9 | −4.2 | −4.1 | −4.0 | −4.2 |

Figure 13:
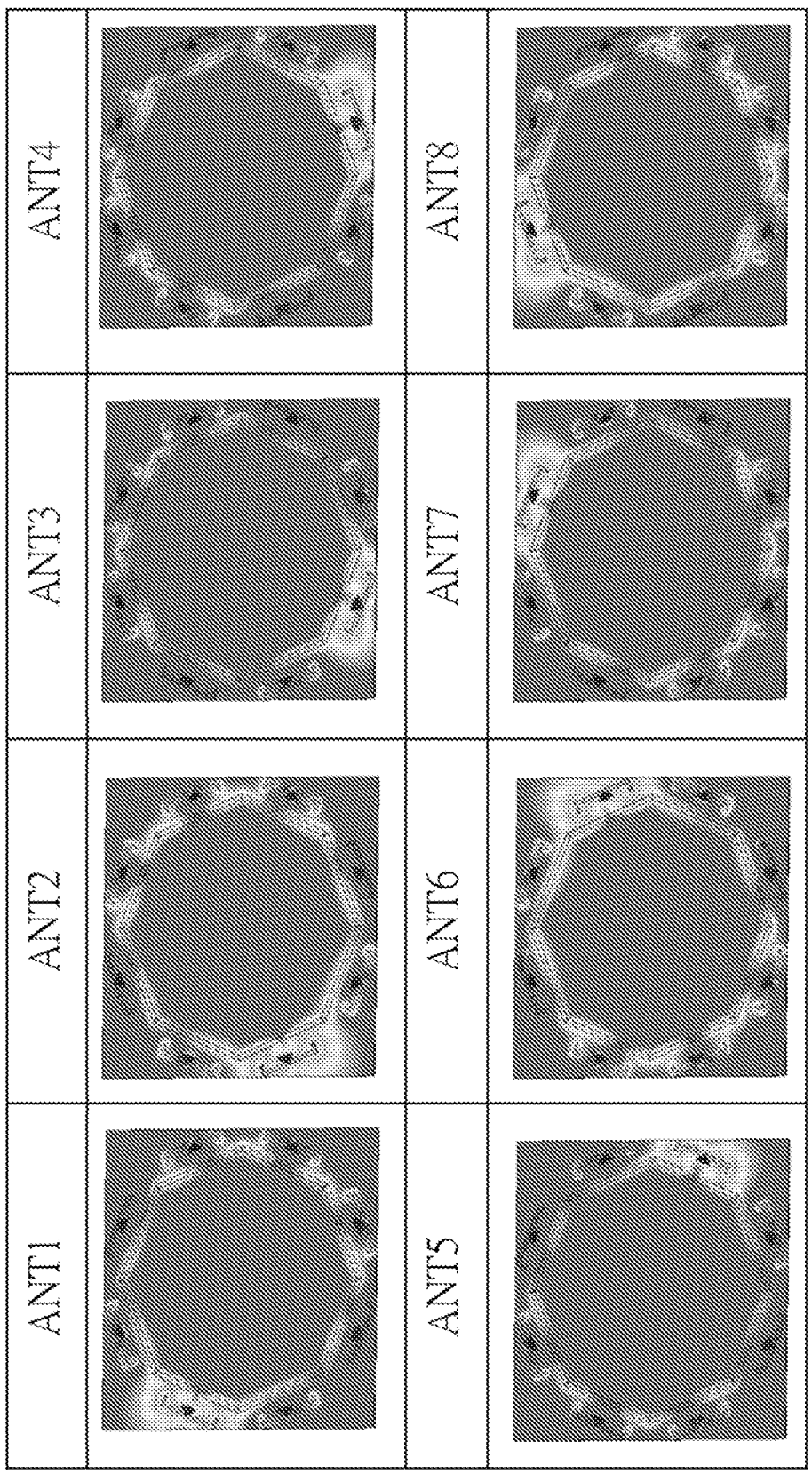
FIG. 13 is a schematic view showing a current distribution of each of the antenna structures ANT1 to ANT8 according to the first embodiment of the present disclosure.

FIG. 13 is a schematic view showing a current distribution of each of the antenna structures ANT1 to ANT8 and clearly shows that a current distribution of the reflecting ring 20 is continuous, even the side wire 22 that is the farthest from one of the antenna structures ANT1 to ANT8 shows a clear current distribution.

Figure 14:
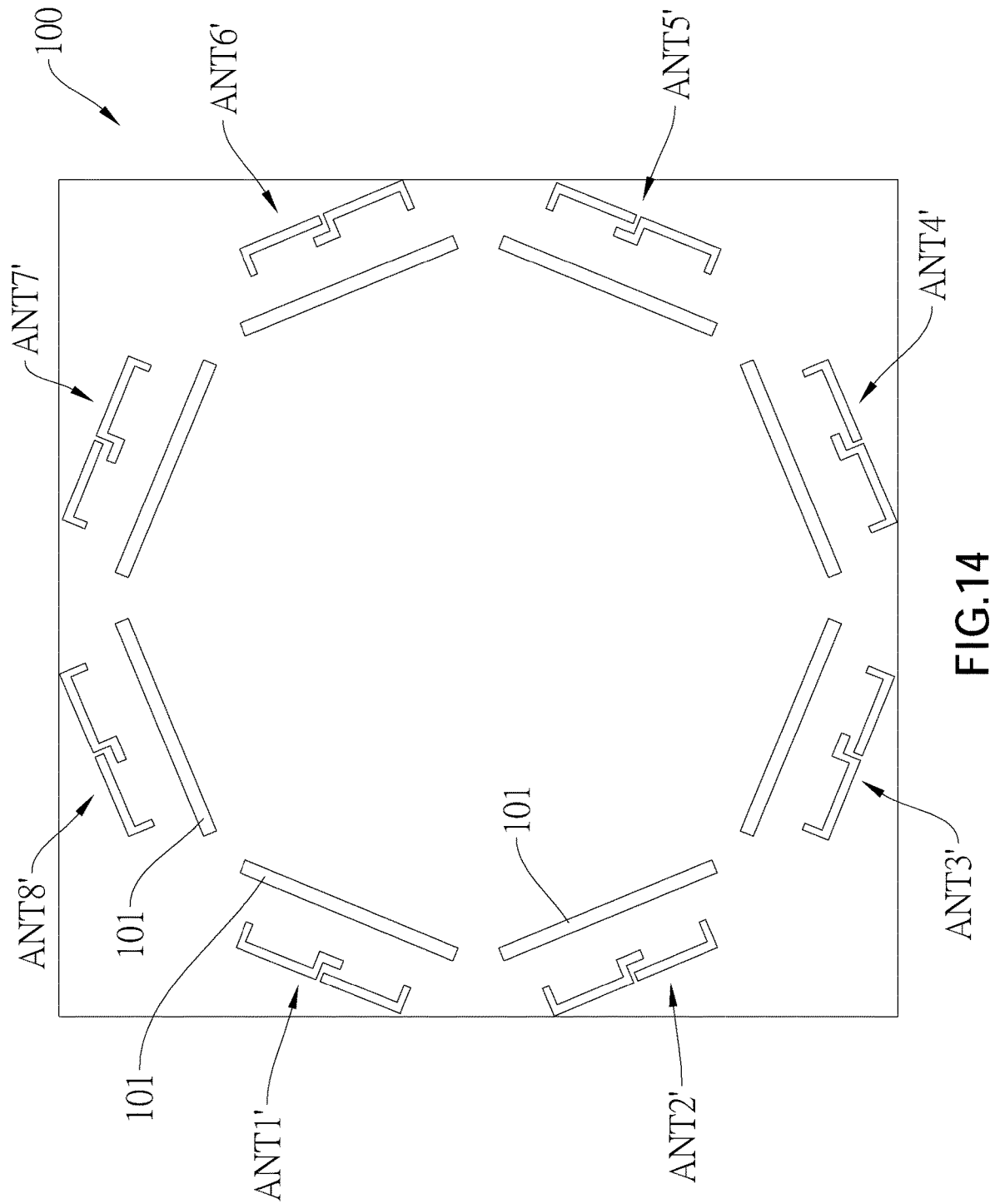
FIG. 14 is a top view of the direction finding antenna according to a first comparative example of the present disclosure.

A direction finding antenna 100 according to a first comparative example of the present disclosure is shown in FIG. 14. Compared with the direction finding antenna 1 in the current embodiment, the direction finding antenna 100 in the first comparative example does not have a closed reflecting ring 20, but a plurality of discrete or discontinuous side wires 101, wherein each of the side wires 101 forms a reflector of one of a plurality of antenna structures ANT1' to ANT8'.

Figure 5:
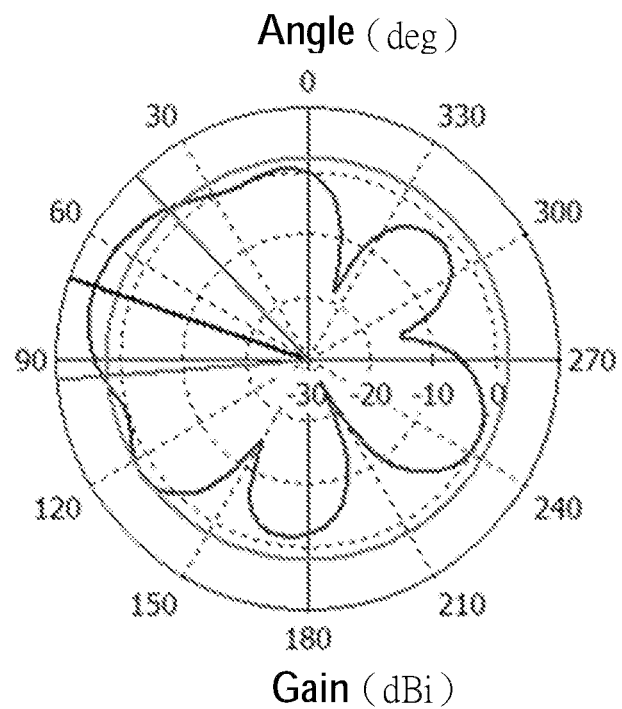
FIG. 5 is a schematic view showing a radiation pattern of the antenna structure ANT1 operating at 2.45 GHz according to the first embodiment of the present disclosure.
Figure 6:
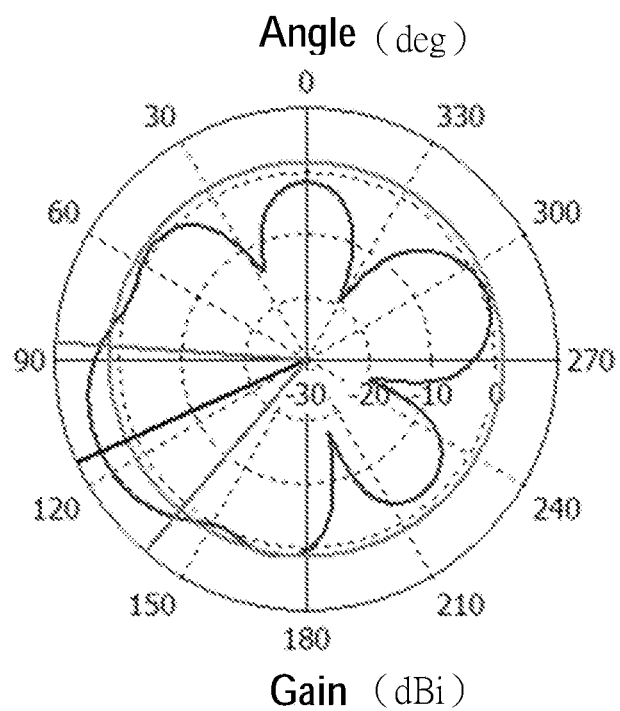
FIG. 6 is a schematic view showing a radiation pattern of the antenna structure ANT2 operating at 2.45 GHz according to the first embodiment of the present disclosure.
Figure 7:
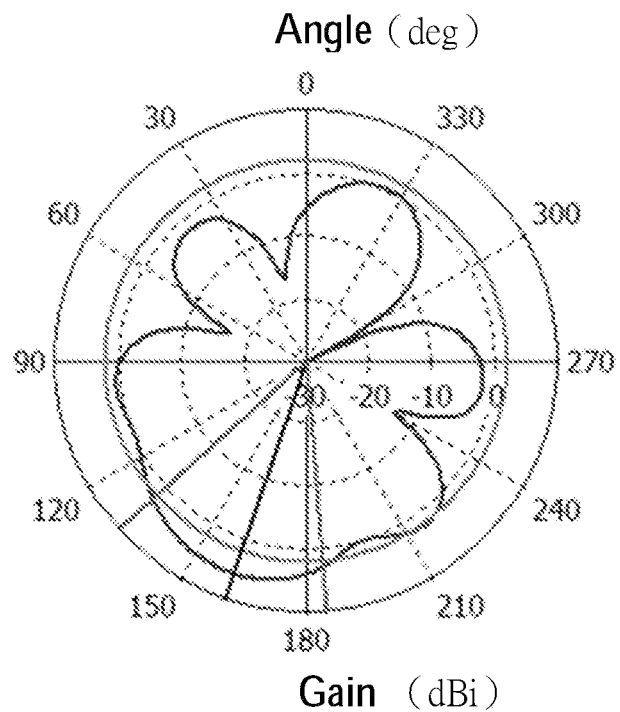
FIG. 7 is a schematic view showing a radiation pattern of the antenna structure ANT3 operating at 2.45 GHz according to the first embodiment of the present disclosure.
Figure 8:
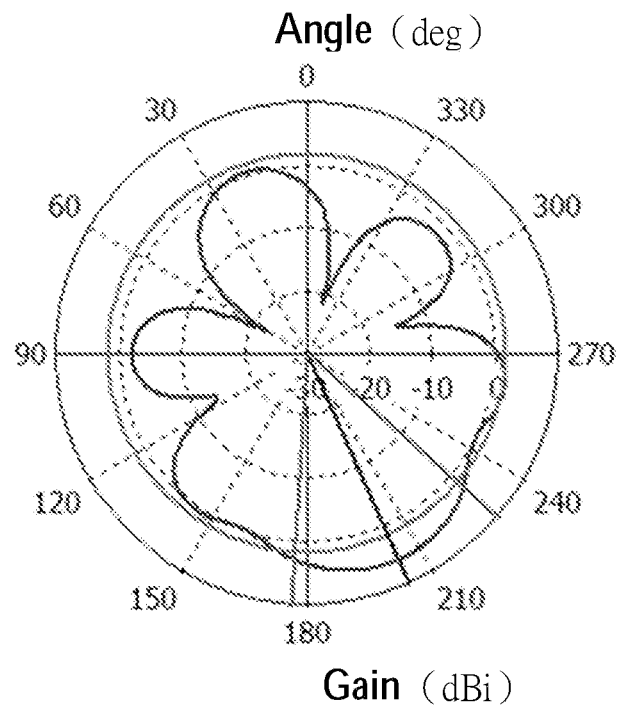
FIG. 8 is a schematic view showing a radiation pattern of the antenna structure ANT4 operating at 2.45 GHz according to the first embodiment of the present disclosure.
Figure 9:
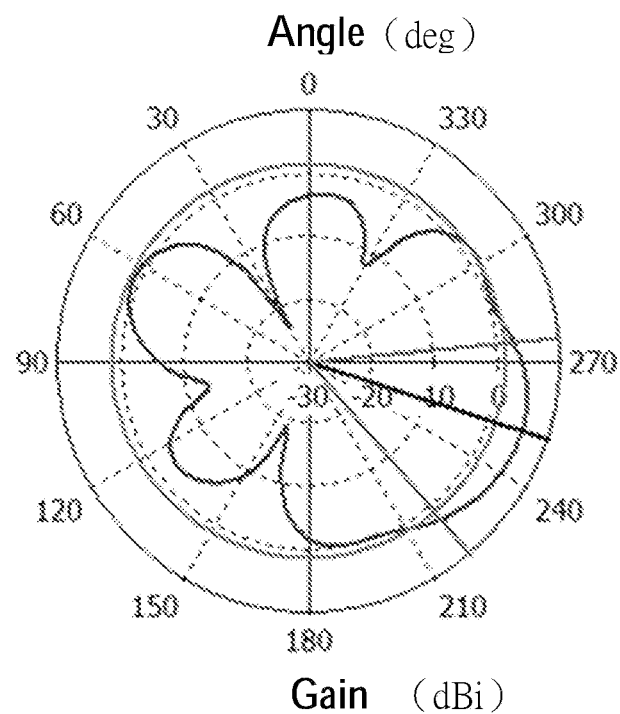
FIG. 9 is a schematic view showing a radiation pattern of the antenna structure ANT5 operating at 2.45 GHz according to the first embodiment of the present disclosure.
Figure 10:
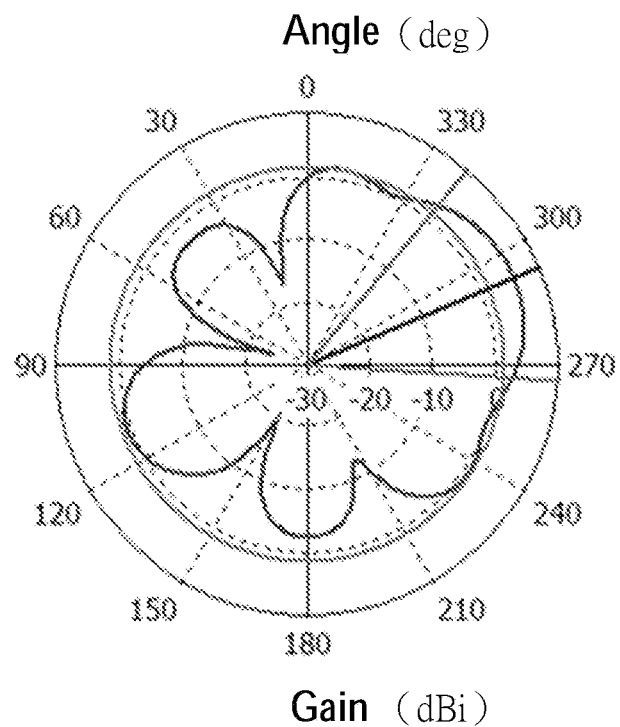
FIG. 10 is a schematic view showing a radiation pattern of the antenna structure ANT6 operating at 2.45 GHz according to the first embodiment of the present disclosure.
Figure 11:
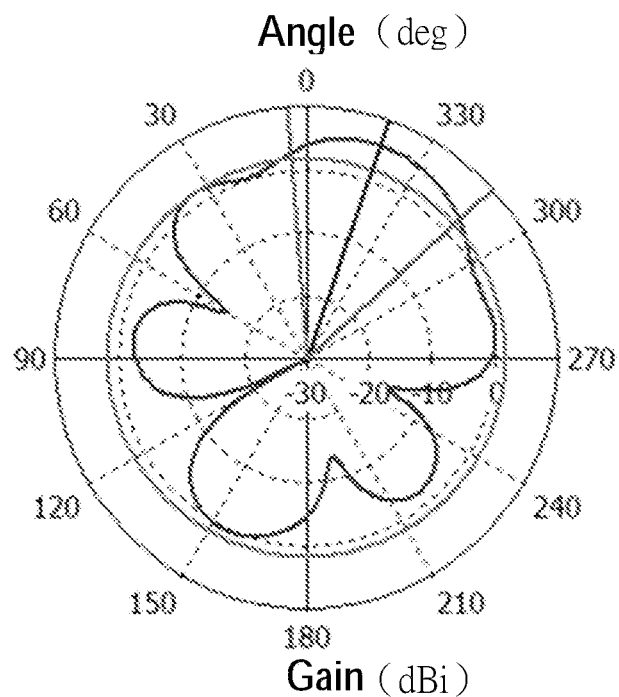
FIG. 11 is a schematic view showing a radiation pattern of the antenna structure ANT7 operating at 2.45 GHz according to the first embodiment of the present disclosure.
Figure 12:
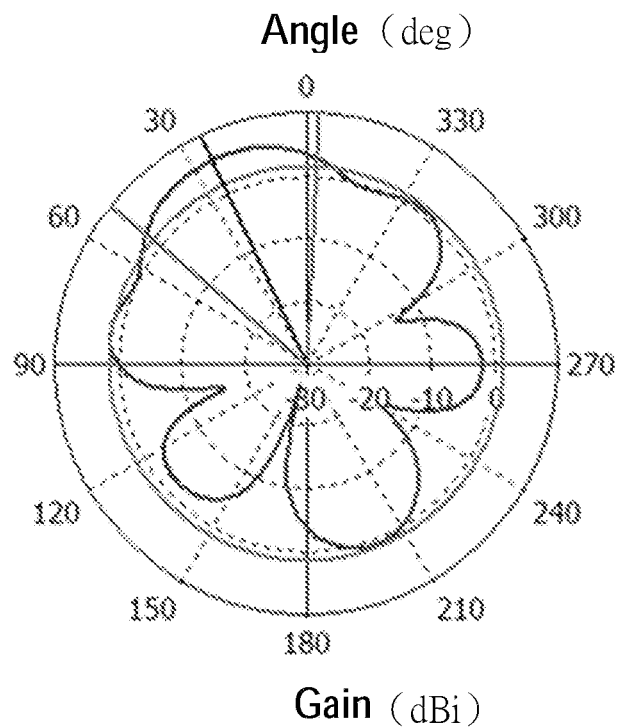
FIG. 12 is a schematic view showing a radiation pattern of the antenna structure ANT8 operating at 2.45 GHz according to the first embodiment of the present disclosure.
Figure 15:
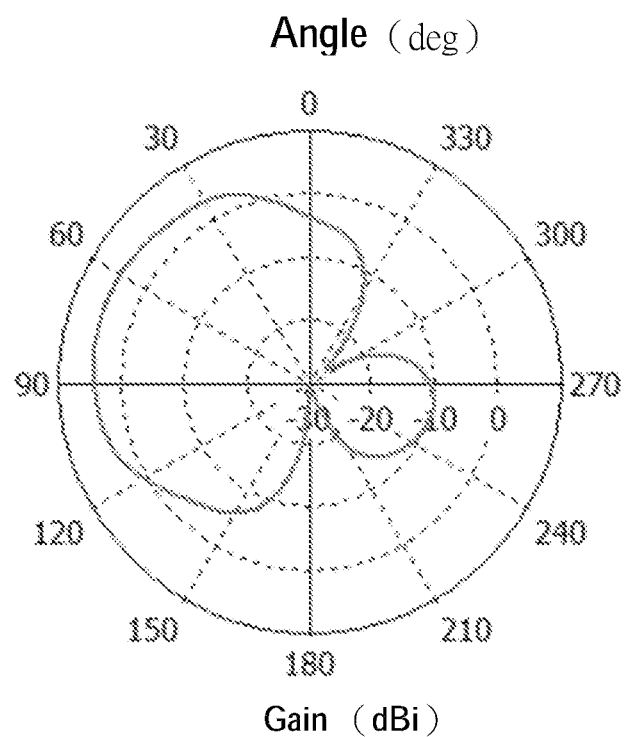
FIG. 15 is a schematic view showing a radiation pattern of the antenna structure ANT1' operating at 2.45 GHz according to the first comparative example of the present disclosure.

FIG. 15 is a schematic view showing a radiation pattern of the antenna structure ANT1' in the first comparative example and indicates that the 3 dB-beamwidth of the antenna structure ANT1' in the first comparative example is 93 degrees. Compared with the antenna structure ANT1 in the current embodiment as shown in FIG. 5 in which the 3 dB-beamwidth is 51.7 degrees, the direction finding antenna 1 in the current embodiment could provide a better accuracy of direction finding than the direction finding antenna 100 in the first comparative example.

Figure 16:
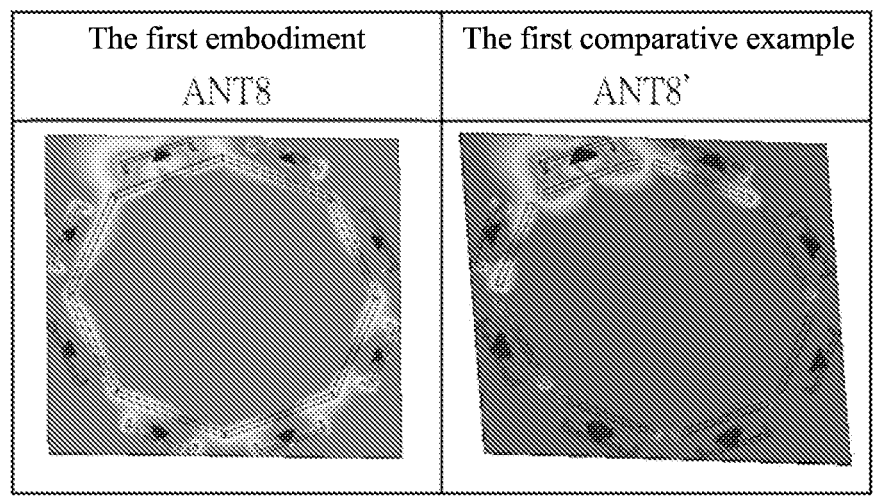
FIG. 16 is a schematic view showing a current distribution of the antenna structure ANT8 according to the first embodiment of the present disclosure and a current distribution of the antenna structure ANT8' according to the first comparative example of the present disclosure.

FIG. 16 is a comparison of a current distribution of the antenna structure ANT8 in the current embodiment and a current distribution of the antenna structure ANT8' in the first comparative example and shows that the side wires 22 of the reflecting ring 20 in the current embodiment have the clear and continuous current distribution, but a current distribution of the side wires 101 in the first comparative example is not continuous, wherein the further from the antenna structure ANT8' that transmits a wireless signal the side wire 101 is, the less clear the current distribution on the side wire 101 is.

As shown in the aforementioned comparison, the direction finding antenna 1 in the current embodiment could be conducive to increasing the accuracy of direction finding of each of the antenna structures ANT1 to ANT8 through the continuous current distribution formed by the closed reflecting ring 20. In other words, the direction finding antenna 1 in the current embodiment could have a better accuracy of direction finding even without using a director.

Figure 17:
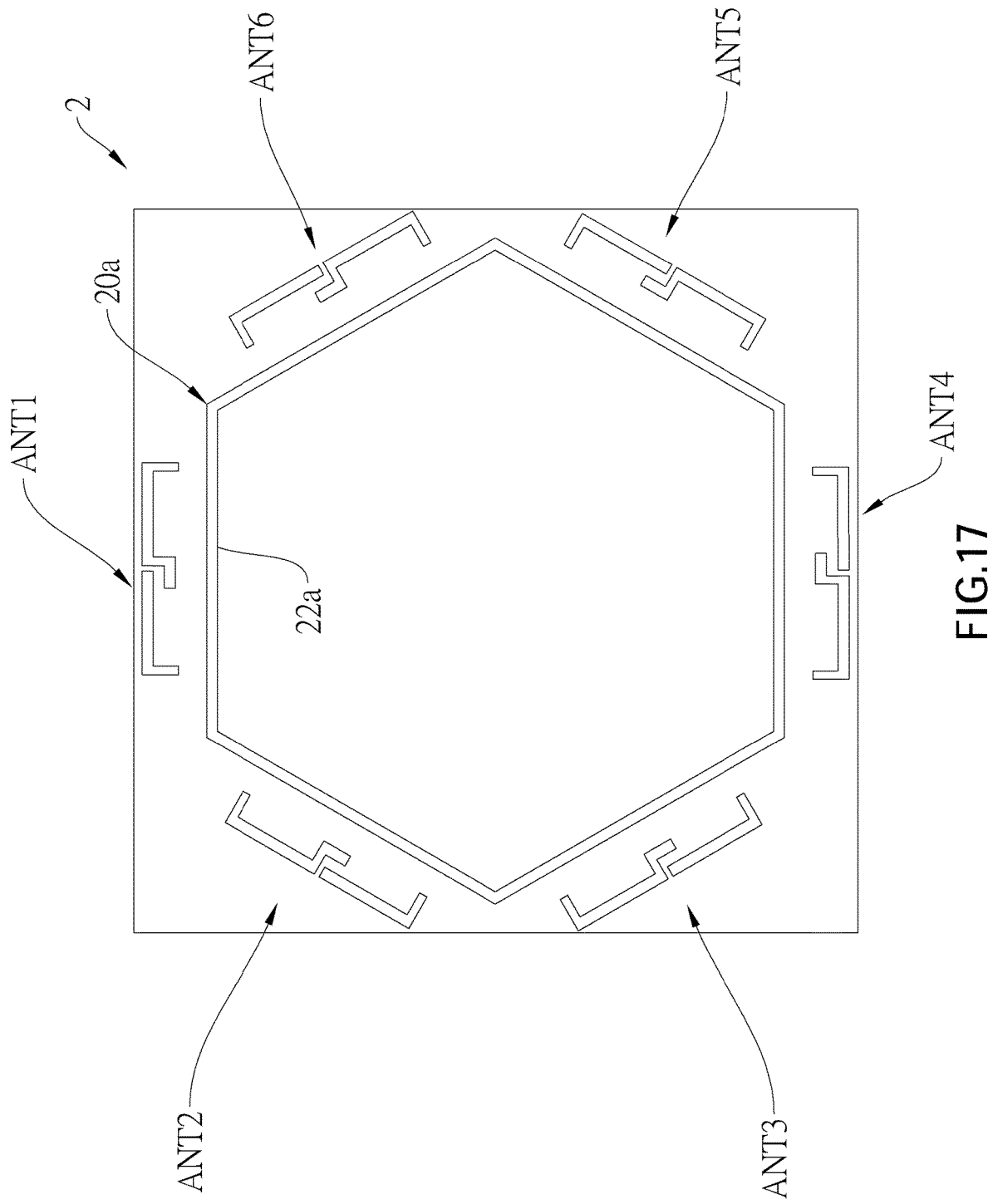
FIG. 17 is a top view of the direction finding antenna according to a second embodiment of the present disclosure.

A direction finding antenna 2 according to a second embodiment of the present disclosure is shown in FIG. 17, which has almost the same structure as that of the first embodiment, except that the number of the antenna structures ANT1 to ANT6 is six, and a reflecting ring 20a is a regular hexagon having six side wires 22a, wherein a length of an outer edge of each of the side wires 22a could be slightly larger or equal to the length L1 of the outer edge of the side wire 22 in the first embodiment.

Figure 18:
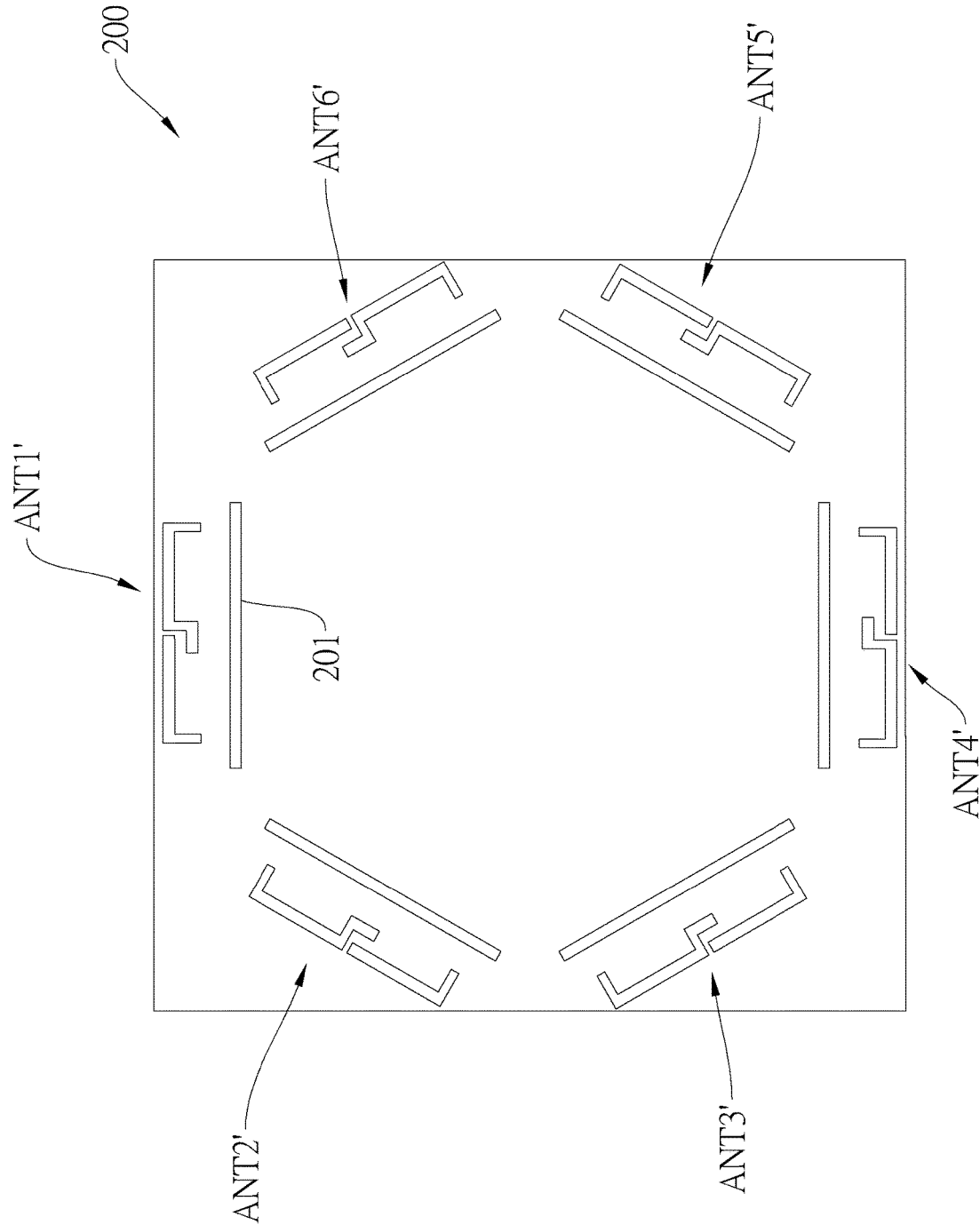
FIG. 18 is a top view of the direction finding antenna according to a second comparative example of the present disclosure.

A direction finding antenna 200 according to a second comparative example of the present disclosure is shown in FIG. 18. Compared with the direction finding antenna 2 in the current embodiment, the direction finding antenna 200 of the second comparative example does not have a closed reflecting ring 20a, but a plurality of discrete or discontinuous side wires 201, wherein each of the side wires 201 forms a reflector of one of a plurality of antenna structures ANT1' to ANT6'.

Figure 19:
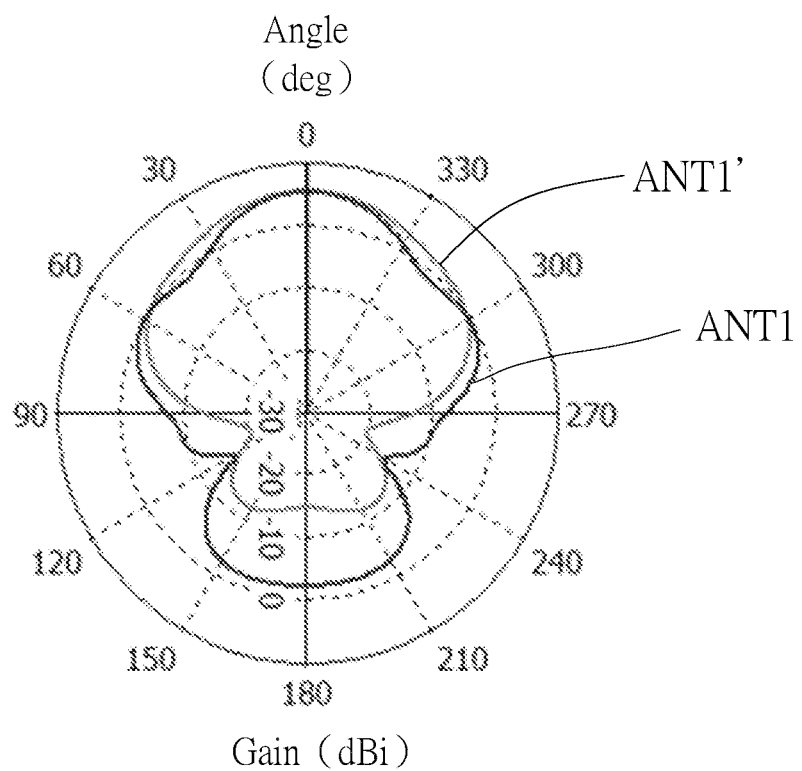
FIG. 19 is a schematic view showing a radiation pattern of the antenna structure ANT1 operating at 2.45 GHz according to the second embodiment of the present disclosure and the antenna structure ANT1' operating at 2.45 GHz according to the second comparative example of the present disclosure.

FIG. 19 is a schematic view showing a radiation pattern of the antenna structure ANT1 in the current embodiment and the antenna structure ANT1' in the second comparative example, wherein a 3 dB-beamwidth of the antenna structure ANT1 in the current embodiment is 48 degrees, and a 3 dB-beamwidth of the antenna structure ANT1' in the second comparative example is 67 degrees, thereby the direction finding antenna 2 in the current embodiment could provide a better accuracy of direction finding than the direction finding antenna 200 in the second comparative example.

Figure 20:
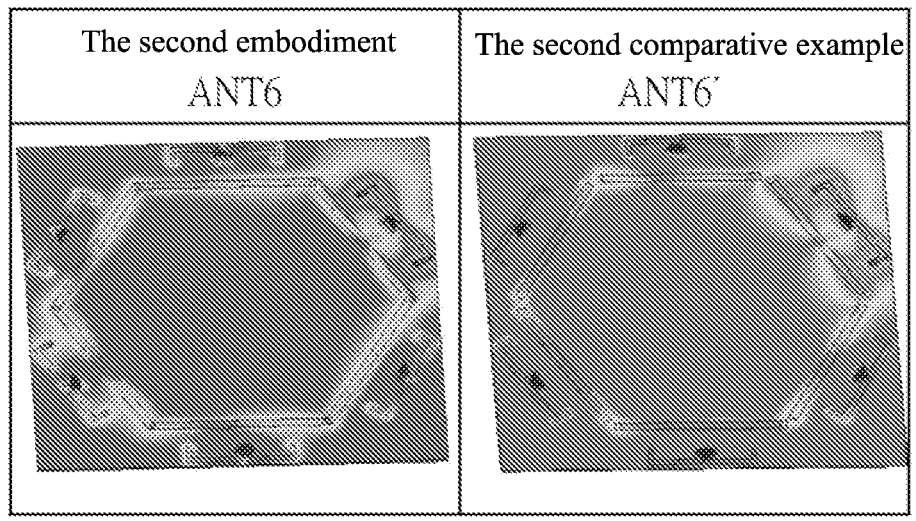
FIG. 20 is a schematic view showing a current distribution of the antenna structure ANT6 according to the second embodiment of the present disclosure and a current distribution of the antenna structure ANT6' according to the second comparative example of the present disclosure.

FIG. 20 is a comparison of a current distribution of the antenna structure ANT6 in the current embodiment and a current distribution in the antenna structure ANT6' in the second comparative example and shows that the side wires 22a of the reflecting ring 20a in the current embodiment have a clear and continuous current distribution, but a current distribution of the side wires 201 in the second comparative example is not continuous, wherein the further from the antenna structure ANT6' that transmits a wireless signal the side wire 201 is, the less clear the current distribution on the side wire 101 is.

The direction finding antenna 2 in the current embodiment could similarly be conducive to increase the accuracy of direction finding of each of the antenna structures ANT1 to ANT6 through the current distribution formed by the closed reflecting ring 20a.

Figure 21:
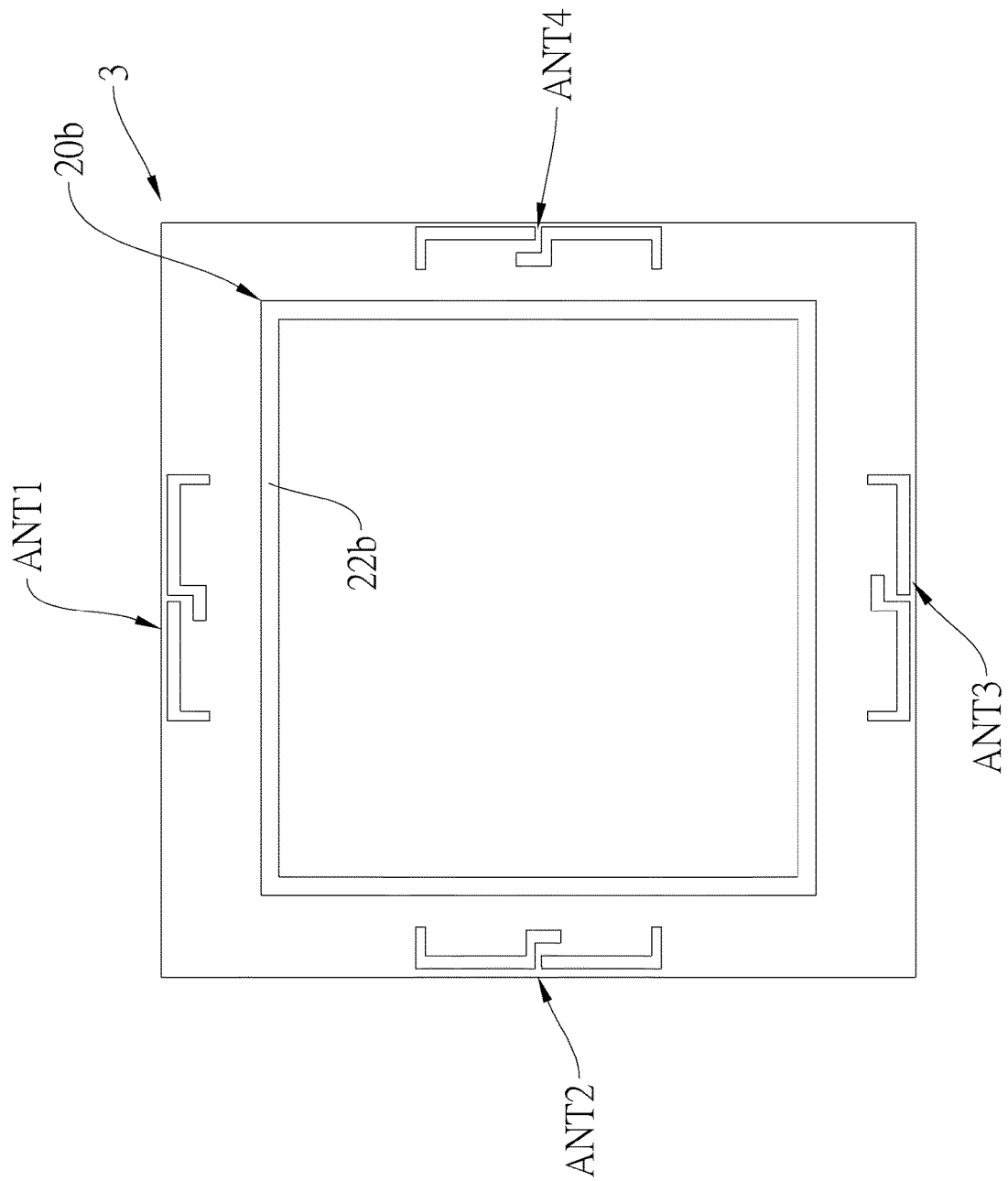
FIG. 21 is a top view of the direction finding antenna according to a third embodiment of the present disclosure.

A direction finding antenna 3 according to a third embodiment of the present disclosure is shown in FIG. 21, which has almost the same structure as that of the first embodiment, except that the number of the antenna structures ANT1 to ANT4 is four, and a reflecting ring 20b is a regular quadrilateral having four side wires 22b, wherein each of the antenna structures ANT1 to ANT4 faces different directions. The direction finding antenna 3 in the current embodiment has the advantages as the same as that of the aforementioned embodiments, thereby the advantages are not stated again.

With the aforementioned design, the direction finding antenna of the present disclosure could effectively increase the accuracy of direction finding through the closed reflecting ring, and could be conducive to miniaturization of the direction finding antenna through the simple structure of the direction finding antenna of the present disclosure.

It must be pointed out that the embodiments described above are only some preferred embodiments of the present disclosure. All equivalent structures which employ the concepts disclosed in this specification and the appended claims should fall within the scope of the present disclosure.

What is claimed is:

1. A direction finding antenna, comprising:
a substrate having a surface;
a reflecting ring disposed on the surface of the substrate, wherein the reflecting ring is formed by connecting a plurality of side wires and is a closed polygon; and
a plurality of radiating elements disposed on the surface of the substrate and located on an outside of the side wires respectively and correspondingly,
wherein the substrate is made of a glass fiber filled EPOXY sheet, a ceramic filled PTFE sheet, a hydrocarbon/ceramic sheet, a Bakelite, or glass fibers,
wherein the reflecting ring is a metal lead wire disposed on the surface of the substrate; a length of each of the side wires of the reflecting ring is identical and the reflecting ring forms a closed regular polygon, and
wherein the radiating elements have the same configurations; each of the radiating elements is a metal lead wire disposed on the surface of the substrate.

2. The direction finding antenna as claimed in claim 1, wherein a number of the side wires is four or more.

3. The direction finding antenna as claimed in claim 1, wherein each of the radiating elements is a dipole antenna and comprises a first radiator and a second radiator that are spaced; the first radiator has a first main section and a first side section, and the second radiator has a second main section and a second side section; the first main section and the second main section are respectively a rectangular shape extending along an axis and being correspondingly parallel to one of the side wire; the first main section has a first end and a second end in a longitudinal direction of the first main section, and the second main section has a first end and a second end in a longitudinal direction of the second main section, wherein the first end of the first main section and the first end of the second main section are adjacent and spaced by a distance; the first side section is connected to the second end of the first main section, and the second side section is connected to the second end of the second main section; each of the first side sections and each of the second side sections of each of the radiating elements extend correspondingly towards one of the side wires.

4. The direction finding antenna as claimed in claim 3, wherein each of the first radiators further comprises a third side section and an extending section, and the third side section is correspondingly connected to the first end of the first main section and correspondingly extends towards one of the side wires; the extending section is connected to the third side section and extends correspondingly to a position between the first end of the second main section and one of the side wires.

5. A direction finding antenna, comprising:
a substrate having a surface;
a plurality of antenna structures disposed on the surface of the substrate and respectively facing to different directions, wherein each of the antenna structures comprises a reflector and a radiating element; the reflectors are connected to form a closed polygon, and the radiating elements are respectively and correspondingly located on an outside of the reflectors,
wherein the substrate is made of a glass fiber filled EPOXY sheet, a ceramic filled PTFE sheet, a hydrocarbon/ceramic sheet, a Bakelite, or glass fibers,
wherein the reflectors form a closed regular polygon; each of the reflectors is a metallic side wire disposed on the surface of the substrate; a length of each of the side wires is identical, and two opposite ends of each of the side wires in an extending direction of each of the side wires are respectively connected to other two of the side wires, and
wherein the radiating elements have the same configurations; each of the radiating elements is a metal lead wire disposed on the surface of the substrate.

6. The direction finding antenna as claimed in claim 5, wherein a number of the reflectors is four or more.

7. The direction finding antenna as claimed in claim 5, wherein each of the radiating elements is a dipole antenna and comprises a first radiator and a second radiator that are spaced; the first radiator has a first main section and a first side section, and the second radiator has a second main section and a second side section; the first main section and the second main section are respectively a rectangular shape and extend along an axis and are correspondingly parallel to one of the reflector; the first main section has a first end and a second end in a longitudinal direction of the first main section, and the second main section has a first end and a second end in a longitudinal direction of the second main section, wherein the first end of the first main section and the first end of the second main section are adjacent and are spaced by a distance; the first side section is connected to the second end of the first main section, and the second side section is connected to the second end of the second main section; each of the first side sections and each of the second side sections of each of the radiating elements extend correspondingly towards one of the side wires.

8. The direction finding antenna as claimed in claim 7, wherein each of the first radiators further comprises a third side section and an extending section, and the third side section is correspondingly connected to the first end of the first main section and extends correspondingly towards one of the side wires; the extending section is connected to the third side section and extends correspondingly to a position between the first end of the second main section and the reflector.

* * * * *